United States Patent
McIntosh et al.

(10) Patent No.: US 7,724,355 B1
(45) Date of Patent: *May 25, 2010

(54) METHOD AND DEVICE FOR ENHANCING ACCURACY IN ULTRASONIC RANGE MEASUREMENT

(75) Inventors: Jason McIntosh, Sugar Hill, GA (US); Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/146,445

(22) Filed: Jun. 26, 2008

Related U.S. Application Data

(63) Continuation-in-part of application No. 11/562,410, filed on Nov. 21, 2006, now Pat. No. 7,414,705.

(60) Provisional application No. 60/740,358, filed on Nov. 29, 2005.

(51) Int. Cl.
G01C 3/08 (2006.01)

(52) U.S. Cl. .................. 356/5.01; 356/5.09; 356/5.1; 356/28

(58) Field of Classification Search .................. 367/100
See application file for complete search history.

(56) References Cited

U.S. PATENT DOCUMENTS

| | | | |
|---|---|---|---|
| 4,398,195 A * | 8/1983 | Dano | 342/46 |
| 6,208,286 B1 * | 3/2001 | Rostislavovich et al. | 342/135 |
| 6,313,825 B1 * | 11/2001 | Gilbert | 345/156 |
| 6,768,540 B2 * | 7/2004 | Kanemitsu | 356/3.14 |
| 7,414,705 B2 * | 8/2008 | Boillot | 356/5.01 |
| 2004/0140430 A1 * | 7/2004 | Micko | 250/342 |
| 2005/0280571 A1 * | 12/2005 | Abatzoglou et al. | 342/25 B |
| 2006/0087414 A1 | 4/2006 | Simonazzi | |
| 2006/0161871 A1 | 7/2006 | Hotelling | |
| 2008/0019569 A1 | 1/2008 | Rhoads | |
| 2008/0134102 A1 | 6/2008 | Movold | |

\* cited by examiner

*Primary Examiner*—Thomas H Tarcza
*Assistant Examiner*—Timothy A Brainard

(57) ABSTRACT

A device (100) and method (300) for enhancing range detection accuracy in ultrasonic touchless sensing applications can include transmitting (302) an ultrasonic signal intended to reflect off a finger and produce an echo, receiving (304) the echo, saving (306) most recent echoes to a history (400), selectively discarding (308) echoes less recently saved in the history to produce a sparse history, identifying (310) a relative phase of the echo with respect to a previously received echo in the sparse history, tracking (312) a location and a movement of the finger from an arrival time of the echo and the relative phase, and providing (314) touchless control to a user interface control in accordance with the location and the movement of the finger.

13 Claims, 6 Drawing Sheets

700

METHOD AND DEVICE FOR ENHANCING ACCURACY IN ULTRASONIC RANGE MEASUREMENT

CROSS-REFERENCE TO RELATED APPLICATIONS

This application is a Continuation-In-Part of U.S. patent application Ser. No. 11/562,410 filed Nov. 21, 2006 now U.S. Pat. No. 7,414,705 claiming the priority benefit of U.S. Provisional Patent Application No. 60/740,358 entitled "Method and System for Range Measurement" filed Nov. 29, 2005, the entire contents of which are hereby incorporated by reference. This application also incorporates by reference the following Utility Applications: U.S. patent application Ser. No. 11/559,295, entitled "Method and System for Directing a Control Action", filed on Nov. 13, 2006, U.S. patent application Ser. No. 11/559,325, entitled "Method and System for Touchless User Interface Control", filed on Nov. 13, 2006; and U.S. patent application Ser. No. 11/562,404, entitled "Method and System for Object Control", filed on Nov. 21, 2006.

FIELD

The present invention generally relates to the field of touchless user interfaces, and more particularly, to computer and media input pointing devices.

INTRODUCTION

Motion sensing systems can detect movement of an object. As one example, a radar unit can transmit and receive high energy signals for detecting a large metallic object. High energy signals can reflect of the metallic object due to the properties of the metal. As another example, a weather radar can be used to track storm movement. The radar can determine the storm distance by measuring a time difference between when a radar signal was emitted and when a reflection of the radar signal was received. Estimating a time of flight generally involves detecting a time of arrival of the reflected signal which can be based on detection of a pulse. The quality of the reflected signal can be distorted due to transmission effects or environmental effects.

Radar is commonly used for long range distance measurements, such as tracking a vehicle or tracking a storm. Radar units are generally large devices deployed in broad areas where long distances are common. The time length of a radar pulse is generally small relative to a time distance of the detected object. Pulse compression can enhance the performance of radar range detection. Pulse compression, also known as pulse coding, is a signal processing technique to maximize the sensitivity and resolution of radar systems. Transmitting longer pulses can improve the radars sensitivity by increasing the average transmitted power. However, lengthening the radar pulse has the effect of degrading the range resolution of the radar because the radio pulse is spread over a larger distance.

Moreover, radar units, or radio frequency signals, are not generally suitable for small and precise range measurements on non-metallic objects. The time length of the pulse can lead to range measurement errors over very short distances. Slight perturbations of a pulse signal can lead to inaccuracies in the time of flight measurement. The pulse can be smeared in time as a result of transmission and reflections which distorts the time arrival for detection. Moreover, sensing devices responsible for emitting and transmitting the pulse signal can be imbalanced. The imbalances produce variations in the pulse that can result to false detections. This can also lead to inaccurate time estimates. Amplitude variations can also lead to detection errors which lead to inaccurate arrival times.

SUMMARY

In one embodiment an ultrasonic sensor device for short-range finger detection and tracking can include a pulse shaper for producing a pulse shaped signal, at least one transmit sensor operatively coupled to the pulse shaper for transmitting the pulse shaped signal, the pulse shaped signal reflecting off the finger to produce a reflected signal, at least one receive sensor for receiving the reflected signal, a phase detector for identifying a relative phase of the reflected signal with respect to a previously received reflected signal, and a processor coupled to the phase detector and the receive sensor for tracking a location and a movement of the finger from an arrival time of the reflected signal and the relative phase, and providing touchless control to a user interface control in accordance with the location and the movement of the finger.

The transmit sensor can be an ultrasonic transducer, a charge coupled device (CCD) sensor, a microphone, a Micro Mechanical Element System (MEMS) transducer, or a microspeaker. The transmit sensor can generate an amplitude modulated region, frequency modulated region, constant frequency region, phase modulated region, a chirp region, or a combination thereof. The pulse shaper can disperse a phase of the pulse shaped signal to produce a phase dispersed pulse signal.

The sensor device can include a memory that stores a history of reflected echoes from previous finger movements in the touchless sensing space, and an indexing unit or table that selects one or more previously received echoes based on a similarity measure of a currently received echo and the history of reflected echoes. The processor can index into the history and structure the indexing based on rates of change of the similarity measure between the previously received echoes.

In a second embodiment, a method for short range detection can include shaping a pulse signal to produce a pulse shaped signal, transmitting the pulse shaped signal, the pulse shaped signal reflecting off a finger to produce a reflected signal, receiving the reflected signal, identifying a relative phase of the reflected signal with respect to a previously received reflected signal, tracking a location and a movement of the finger from an arrival time of the reflected signal and the relative phase, and providing touchless control to a user interface control in accordance with the location and the movement of the first object.

The shaping can use a combination of amplitude modulation, frequency modulation, and phase modulation. The method can include converting the location and the movement to a coordinate or control action to associate with the user interface control. The step of identifying can include identifying an arrival time from a correlation between a first reflected signal and a second reflected signal, identifying a phase delay from the correlation for establishing a relative displacement of the finger, and controlling the user interface control in accordance with the arrival time and the relative displacement. Recent echoes can be saved to a history, and echoes less recently saved in the history can be selectively discarding, for example, based on a similarity measure between echoes in the history.

In a third embodiment, a method for enhancing range detection accuracy in ultrasonic touchless sensing applications can include transmitting an ultrasonic signal intended to reflect off a finger and produce an echo, receiving the echo, saving most recent echoes to a history, selectively discarding echoes less recently saved in the history to produce a sparse history, identifying a relative phase of the echo with respect to a previously received echo in the sparse history, tracking a location and a movement of the finger from an arrival time of the echo and the relative phase, and providing touchless control to a user interface control in accordance with the location and the movement of the finger.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
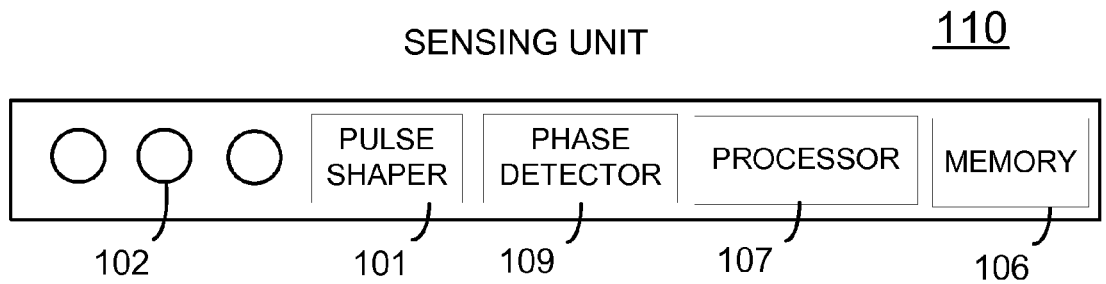
FIG. 1 is a touchless sensing unit for range detection in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

Tracking objects using ultrasonic signals requires the ability to differentiate between echoes from the targets and background objects. Typically, the targets are moving objects and the background objects are stationary. Background objects are typically to be ignored and the targets are to be followed.

FIG. 1 shows a sensing unit 110 for motion detection. The sensing unit 110 can include a pulse shaper 101 for producing a pulse shaped signal, at least one transmit element 102 for transmitting the pulse shaped signal, the pulse shaped signal reflecting off a first object to produce a reflected signal, at least one receive sensor 102 for receiving the reflected signal, a processor 107 operatively coupled to the receive sensor for identifying a location and a movement of the first object from the reflected signal, and a memory 106 for storing a history of echoes and associated parameters. The transmitter and emitter can be the same element to provide both transmit and receive operations. The sensing elements 102 can be operatively coupled to the pulse shaper 101 and the phase detector 109. The phase detector 109 can identify a phase of the reflected signal, and the processor 107 can use the phase to identify the movement. The processor 107 can include additional processing logic such as thresholds, comparators, logic gates, clocks, and the like for detecting an object's motion.

The sensing element 102 can be an array of sensing elements. As one example, the sensing element can be an ultrasonic transmitter and ultrasonic receiver 102 for transmitting and receiving ultrasonic signals. In another arrangement, the sensing element 102 can be an array of micro-acoustic microphones and micro speakers for transmitting and receiving audio signals. The transmitter and emitter can be the same transducer for providing dual functions. In another arrangement, the sensing element can be CCD camera elements or MEMS camera elements for receiving light. In the case of using ultrasonic sensing elements, the sensing unit 110 can employ pulse-echo detection for estimating a range of an object within view of the sensing elements. The sensing unit 110 can be an Application Specific Integrated Circuit (ASIC) or Field Programmable Gate Array (FPGA).

To perform differentiation between background objects (e.g., a keyboard) and a moving target (e.g. a finger), a pulse-echo trace from an ultrasonic receiver can be stored in the memory 106 under the condition of only background objects being in the sensing range (i.e. no targets present). The pulse-echo trace saved in the memory 106 can then be subtracted from subsequent pulse-echo traces to obtain the pulse-echo from the moving targets alone.

Background objects that move either very slowly so as to be of no interest or move suddenly due to a physical configuration change in the sensing field can however distort received echoes. During such distortions, the background object pulse-echo trace can be updated in the memory in accordance with the methods herein described to adapt to the changing environment (e.g., slowly moving background object) in order to mitigate the echo distortions. This adaptation involves differentiating between the motion of background objects and the motion of the targets, such as the moving finger.

Briefly, an echo return can include a primary response (PR) component an ambient component (A), and a noise (N) component. The echo return is based on the distance from a transmit (TX) to receive (RX) path. The echo return (reflection) can also include a direct path (DP) component that degrades the signal to noise ration (SNR) of the primary echo to the competing noise echoes. The DP may be direct from TX to RX elements. Subtracting the PR of a previous echo saved in a history within the memory 106 can be performed when the current PR subtraction does not yield acceptable discrimination to improve tracking resolution. The echo can also contain secondary reflections which together with the direct path can be termed the ambient component. The PR is desired, the A is undesired, and the noise is undesired. Embodiments herein are directed to an adaptive scheme that estimates the tracking and update of the echo since the ambient component change with time.

Figure 2:
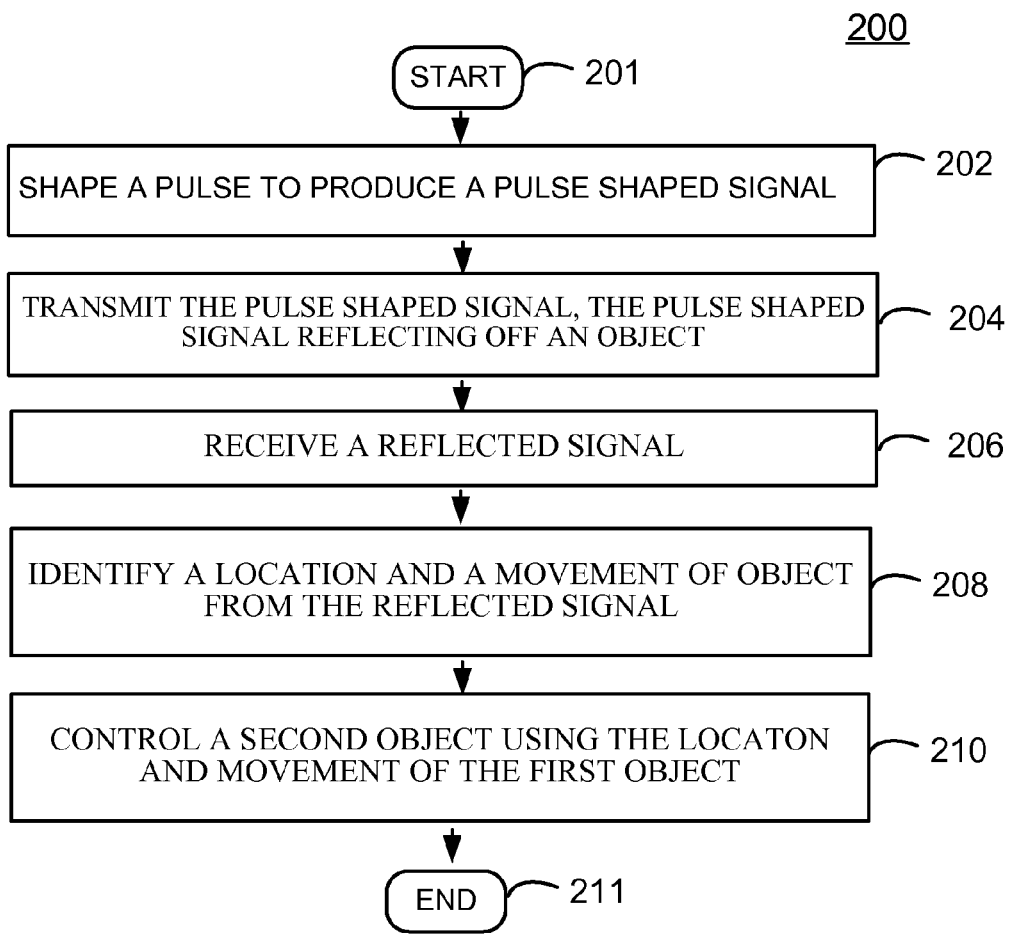
FIG. 2 is method for touchless control using range detection and pulse shaping in accordance with an embodiment of the inventive arrangements.

Referring to FIG. 2, a method 200 for range detection is shown. When describing the method 200, reference will be made to FIG. 1, although it must be noted that the method 200 can be practiced in any other suitable system or device. Moreover, the steps of the method 200 are not limited to the particular order in which they are presented in FIG. 2. The method 200 can also have a greater number of steps or a fewer number of steps than those shown in FIG. 2.

At step 201, the method 200 can start. At step 202, a pulse can be shaped to produce a pulse shaped signal. In practice, the pulse can be a square wave signal that can be input to a transmit element. The pulse can cause the transmitter element to vibrate for the duration of the pulse. For example, referring to FIG. 1, the processor can generate a pulse with a 10 volt rising and falling edge. If the processor sends the pulse to a transmit element 102, the transmit element will emit a pulse at a fundamental frequency of the transducer. For example, the transmit element 102 may have a fundamental frequency of 40 Khz. In response to the pulse, the transmit element will turn on and off for a duration equal to the time length of the pulse. The transmitter may however ring which smears the pulse. Accordingly, the processor 107 can send the pulse to the pulse shaper 101 for shaping prior to transmission. The pulse shaper can focus the energy of the pulse into a narrow peak by introducing phase dispersion and frequency modulation. This suppresses some of the smearing since the energy is spread out over a larger frequency band.

At step 204, the pulse shaped signal can be transmitted. The pulse shaped signal can reflect off an object and produce a reflection signal. For example, referring to FIG. 1, a transmit element 102 can emit the pulse shaped signal, which can reflect off an object in a field of view of the transmitter. The field of view is dependent on the signal strength of the pulse, and the location of the object in the view. At step 206, the reflected signal can be received. For example, referring to FIG. 1, a receive element 102, which also may be a transmit element, can capture the reflected signal. The processor 107, which is operatively coupled to the receive element 102, can identify a movement and location of the object from the reflected signal, which corresponds to step 208. In particular, the reflected signal is a delayed and slightly distorted version of the pulse shaped signal. Accordingly, the reflected signal has highly concentrated energy in time yet spread out in frequency. The processor 107 can apply an inverse pulse shape filter to restore the original pulse. The processor 107 can then identify a rising edge of the pulse to determine an arrival time of the reflected signal. Briefly, the inverse pulse shape performs the opposite as the pulse shaper. That is, the inverse pulse shaper spreads out the concentrated energy over a narrow frequency range.

At step 210, a second object can be controlled using the location and the movement of the first object. For example, the sensing unit 110 detects a location and movement of an object within a field of view, and uses the location and movement to control another object that is not within the field of view. As one example, the first object can be a control object, and the second object can be a controlled object. The second object can be controlled in accordance with a location and movement of the first object. At step 211, the method 200 can end.

As previously indicated, background objects that move either very slowly so as to be of no interest or move suddenly due to a physical configuration change in the sensing field can distort received echoes and introduce tracking errors. To mitigate tracking errors associated with slow movement of background objects, echoes in one embodiment herein are stored in a history for a period of time that is greater than a movement of a background object.

Figure 3:
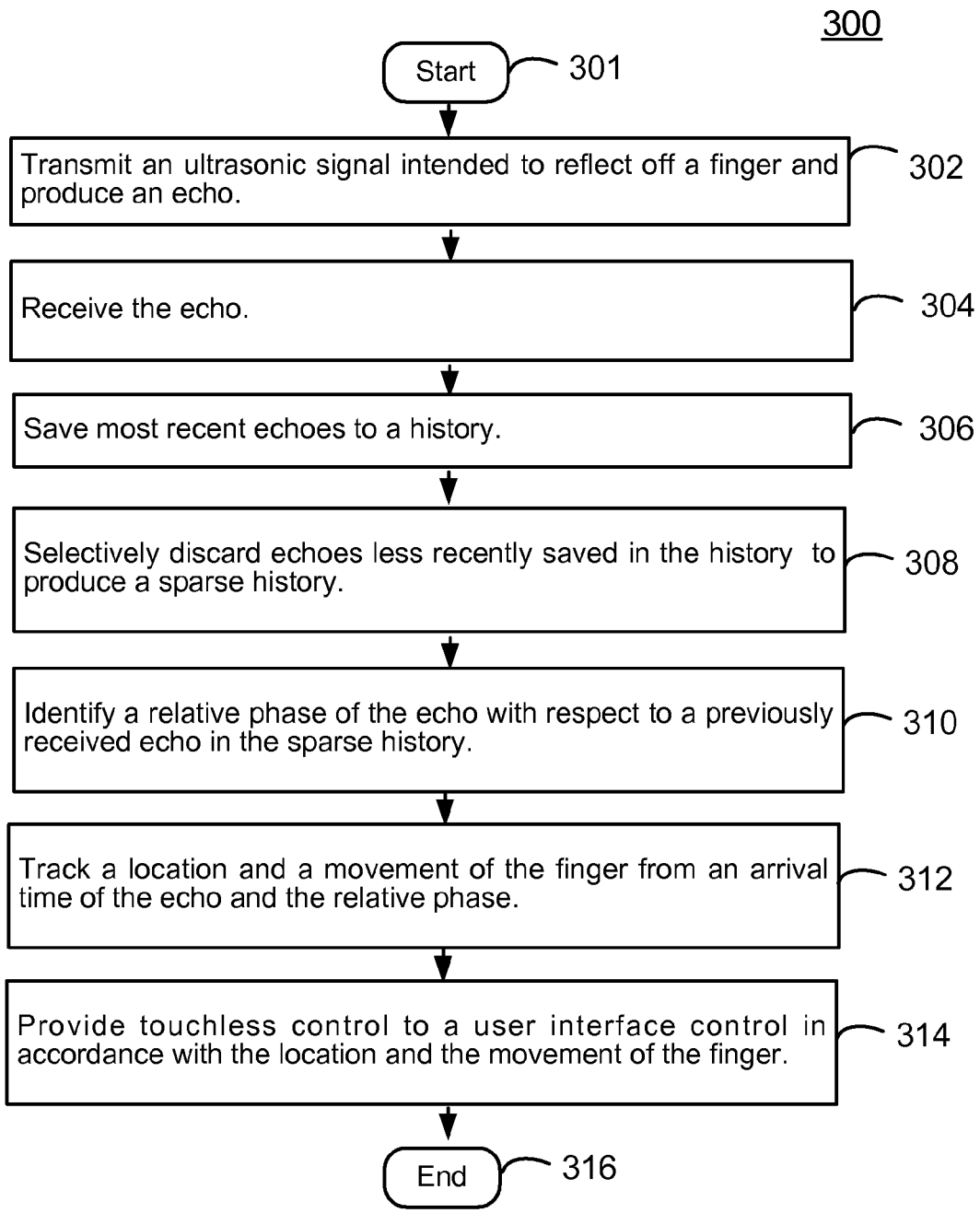
FIG. 3 is a method for improving range accuracy in accordance with an embodiment of the inventive arrangements.

FIG. 3 is directed to an exemplary method for enhancing accuracy in range measurement. The method 300 can be practiced with more or less than the number of steps shown and is not limited to the order of steps shown. Moreover, the method 300 is not limited to improving accuracy using only pulse compression. The method 300 is suitable for improving accuracy in non pulse shaping systems.

At step 302 an ultrasonic signal intended to reflect off a finger is transmitted that produces an echo. At step 304, the echo is received. If an object is stationary within the environment, or slowly moving, the method 300 provides fast adaptation to background objection motion without fully resolving the motion of all objects (background and targets) in the touchless sensory field.

At step 306, most recent echoes are saved to a history. The echoes can be recorded for a length of time, $T_{store}$, that is substantially longer than the time that the targets (e.g. finger) will have traveled a distance of interest. For instance, under the condition that tracked targets move with minimum velocity $V_{min}$ and with a resolution of distance $D_{min}$, then the maximum time that target will need to be observed will be $D_{min}/V_{min}=T_{max}$. Thus by setting $T_{store}$ to be greater than $T_{max}$, significant changes in the pulse-echo response from the target can be captured. The part of the echo that does not change over this time period can be associated with the background objects and ignored for purposes of detection and tracking.

Let $T_{diff}$ be the time difference between a pulse-echo trace just recorded and a pulse-echo trace taken $T_{diff}$ seconds ago. Let $E_{diff}$ be the pulse-echo trace achieved by taking the most recent trace measured and subtracting the trace measured $T_{diff}$ seconds ago. The method 300 for tracking target motion chooses $T_{diff}$ to be as small as possible and yet still achieve an $E_{diff}$ trace with large enough signal content so as to be able to track the targets. While this will discard some of the information about the moving targets, it will minimize the echoes residuals from the background objects.

Figure 4:
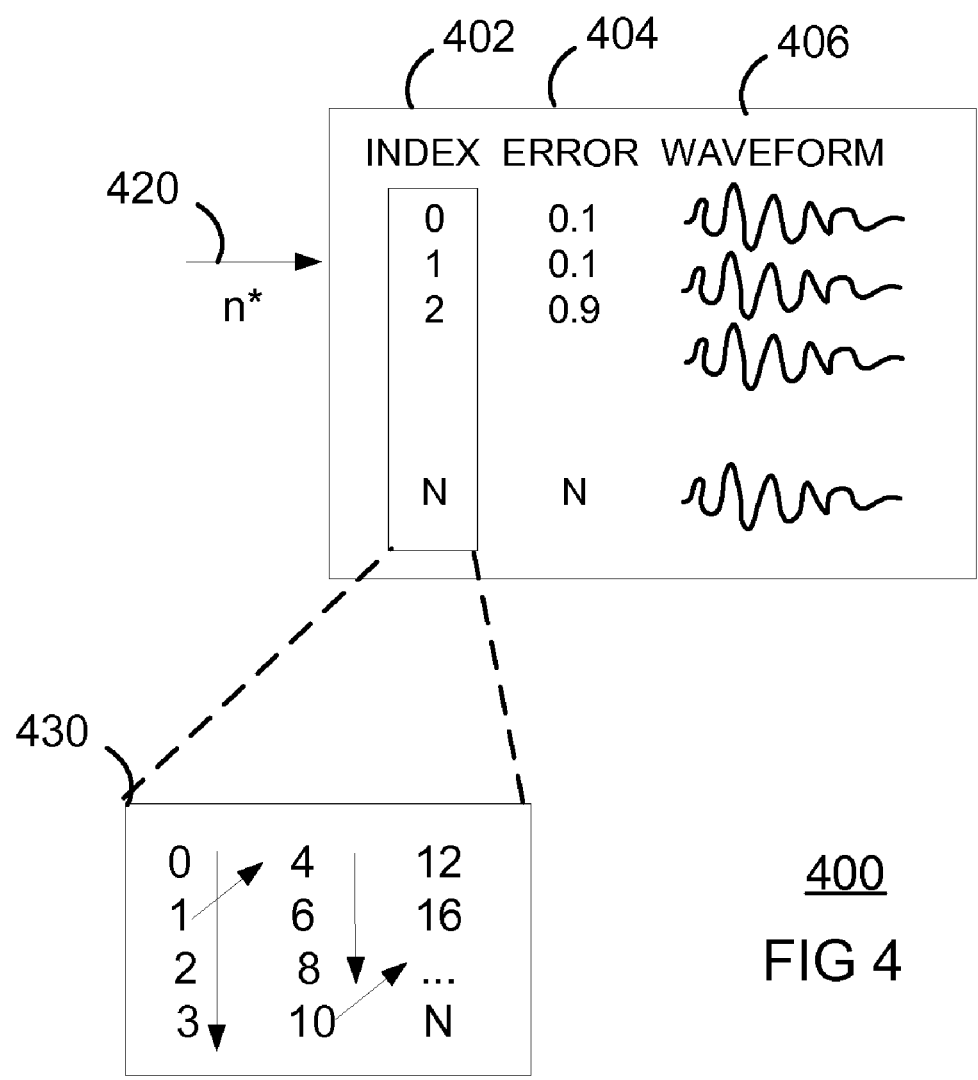
FIG. 4 is an exemplary configuration of a history buffer and indexing table for storing and retrieving echoes in accordance with an embodiment of the inventive arrangements.

Returning back to FIG. 3, at step 308, echoes less recently saved in the history are selectively discarding to produce a sparse history. Notably, as $T_{diff}$ becomes large, the targets will be moving slower and thus the need to store the entire echo history can be relaxed as there will be little information difference between the echoes for slow moving targets. Thus the echo storage can become sparse as the traces become older and older. In one embodiment, an indexing table is proposed that is more efficient at storing traces when the history becomes sparse and as the traces become older. For instance, FIG. 4 illustrates an exemplary history 400 for the echoes. The history 400 can include an index entry 402, an error entry 404, and a waveform entry 406. The error entry can identify errors for nearest neighbor as well as all waveforms in the history 400. (The error entry 404 can be a matrix).

Another method is to store the latest N echoes in a memory bank, call this BANK0. As new echoes arrive for storage into BANK0, every other (or every $3^{rd}$, $4^{th}$, etc.) echo in BANK0 is moved into another bank, call it BANK1. Then as echoes in BANK1 are replaced, the process of moving every other (or every $3^{rd}$, $4^{th}$, etc) echo in BANK1 into another bank, call it BANK2, is repeated. This process can continue until sufficient echoes are stored to realize the $T_{max}$ requirement while significantly reducing the amount of memory required to store the traces.

Selectively discarding echoes can include selectively pruning the history 400 based on one among an L2 norm based, spectral distortion based, log-likelihood based, or mean-squared error based metric. The sparse history of echoes can be created as a difference rate between echoes. An index table (e.g., index entry 402) into the history 400 can be updated as echoes are selectively pruned according to the sparse history. The sparse history can weight echoes more heavily in the near-time than in the far-time. The method 300 can include iteratively scanning through the history to identify an index 402 for the echoes where an echo difference (e.g. error 404) is significantly greater than a noise difference.

For instance, the method 300 can include comparing the echoes in the history 400 for similarity, selectively pruning echoes in the history with high similarity (e.g. based on difference rate, or distortion norms), and replacing the pruned echoes with echoes having low similarity. The method 300 can include generating an index table for the echoes in the history such that the history 400 then identifies echoes with time indexes 402 and corresponding distance measures (e.g. error 404). The method 300 can include comparing a present echo to the echoes in the history to calculate an updated set of differences, and removing echoes in the history 400 that do not contribute a noticeable difference based on the updated set of differences for pruning the echoes in the history. An echo can be subtracted if a current ambient component is distorting the echo. The history table can indirectly store information associated with previous ambient components. Echo components received from a non-moving object in proximity of the finger can be adaptively removed to increase a signal to noise ratio of the echo for tracking the finger when the finger is moving.

At step 310, a relative phase of the echo is identified with respect to a previously received echo in the sparse history. A location and a movement of the finger can be traced at step 312 from an arrival time of the echo and the relative phase. At step 314, touchless control to a user interface control can be provided in accordance with the location and the movement of the finger. The method 300 can end at step 316.

As shown in FIG. 4, the history 400 includes the index entry 402, the error entry 404, and the waveform entry 406, although other entries are herein contemplated that can be stored in the history. An optional efficient table index 430 permits fast adaptation, storing, and pruning of echo waveforms in the history 400. The history 400 can thus contain data for previously stored echoes, indexes, and associated errors amongst one another. The waveform data can be in compressed or non-compressed format, for example, including compressed feature and time stamp data.

The history 400 permits previously stored echoes to be referenced and subtracted from the current echo to improve the overall SNR for improving finger tracking performance. A distance between the current echo and the history of echoes can be calculated to generate a similarity measure (e.g. distortion, distance, likelihood) of the history and stored as the error 404 with the history 400. Echoes with low distance (high similarity) can be discarded from history (e.g., memory) and replaced with echoes having greater distances (e.g. errors). The history 400 can then contain, for example, echoes with time indexes 402 and distance measures 404. Each of the echoes 406 in history 400 can be compared against the current echo to calculate a new set of distances. In such cases, the previous echo can be subtracted off if a current ambient component is distorting the echo. Since the ambient component changes, the history 400 can indirectly store information associated with previous ambient components.

This approach saves most recent n (index 403 into history) or n small, since there are typically many echo waveform changes in the near time. In contrast, the echoes from far-time (past time) can be selectively pruned based on current distance measures (e.g., L2 norm, spectral distortion, log-likelihood, MSE, energy metrics). In practice, the most recent n echoes can be saved, and echoes from longer ago in the history can be selectively discarded based on the distances, to create a sparse history that is weighted more heavily in the near-time than in the far-time.

In one embodiment, a difference rate can be used to efficiently index into the history 400 based on jump tables, integer multiplication rates, and look up indexes. For instance, each column in the table can be associated with a delta echo (subtraction difference). As an example, n an be iteratively chosen by scanning through the echo history, and looking for the n wherein $ePR(i)-ePR(i-n) \gg n(i)-n(i-n)$ so that n* is large but the echo difference for ambient conditions currently and in the past are approximately zero.

$$e = ePR + eDP + eSR + N \mid \leftarrow eA \rightarrow \mid$$

where, e is echo, PR is primary reflection, DP is Direct Path, SR is Secondary Reflection, N is noise, A is Ambient, and eA is Ambient Echo.

$$e = ePR(\text{desired}) + eA(\text{undesired}) + N$$

$$ePR = e - eA'$$

where, eA' changes with time in accordance the adaptive scheme:

$$e_i = ePR(i) + eA(i) + N_i$$

$$de\langle i,n \rangle = e_i - e\langle i-n \rangle$$

$$de\langle i,1 \rangle = e_i - e\langle i-1 \rangle$$

where $e_i$ is the $i^{th}$ echo and $de\langle i,n \rangle$ is the $i^{th}$ echo difference (delta) with respect to the $n^{th}$ echo in the history table 400. Regions of overlay can be then identified based on the echo history (e.g. echo buffer)

$$de\langle i,n \rangle = ePR(i) - ePR(i-n) + eA(i) - eA(i-n) + N_i - N\langle i-n \rangle$$

Exemplary plots of eA and ePR indicate that eA changes slowly $$eA(i) - eA(i-n) \sim = 0$$

such that $$de\langle i,n \rangle \sim = ePR(i) - ePR\langle i-n \rangle + N_i - N\langle i-n \rangle$$

Thus, n can be choose so that $$ePR(i) - ePR(i-n) \gg N_i - N\langle i-n \rangle$$

by selecting n* large but checking for $eA - eA(i-n) \sim = 0$. That is, the history 400 can be searched for the largest index n* that produces a significant differential and that exceeds a noise difference for the selected waveforms.

de (i,n)* de (i−1,n)

Previously $e_i - eA \sim = eDP(i)$

E(i−1)−eA

New $e_i - e(i-n)^* \rightarrow$ optionally minimizes changes in e Ambient

E(i−1)−e(i−n)

Accordingly, most recent echoes for n (small) can be saved in the history since most of the recent echoes change in the near-time. Echoes saved farther in the past (e.g. far-time) can be selectively pruned based on their respective distances amongst one another. In such regard, the system does not need to save as many echoes in the history for large difference rates and adapts to ambient changes in the near-term and n*.

Referring to FIG. 4, the index entry 402 can also be represented as an index table 430. The index table provides an efficient data indexing structure to selectively prune and update waveform entries 406 in the history 400. Generally stated, the index table 430 permits efficient saving of the most recent n echoes, and then selectively discards echoes in the past based on generated similarity measures, to create a sparse staggered echo history represented by the index table 430. So, instead of continually shuffling waveform entries and corresponding index and error entries to represent a proper time representation, the index table 430 efficiently keeps track of the current location of waveforms in the history 400 by representing the time aspect in the index entries of the index table 430.

For instance, as an example, the index table 430 initially captures echoes that are stored consecutively in a proper time order e=0, 1, 2, 3, 4, 5, 8, 10, 12, 16, 20, and 24. The index n into the index table 430 can then be updated based on a different indexing rate, for instance d=1 d=2 d=4 d=8 etc (d-delta). In such regard, the index table 430 places echoes in locations of importance and effectively compresses the time scale based on similarity (or difference) measures. The difference rate is a function of finger movement and provides fast adaptation of objects entering and leaving the touchless sensing field. For instance, the faster the finger moves, the faster the indexing table 430 can flush out previously stored secondary echo components (e.g., due to slowly moving object).

When the finger is moving fast, there can be significant differences in near-time echoes, whereas if the finger is moving slowly, there may be less difference between consecutive echoes. In the latter case, the difference may be the noise floor. Thus, the indexing table 430 retrieves further back in memory, echoes that have greater dissimilarities with the present echo. In effect, this action of going back further into the echo history mitigates the effects of residual or contributory echoes from other objects moving more slowly than the finger. Consequently, a finger that moves faster than another object moving in its proximity can be accurately tracked. The secondary object which is not moving significantly relative to the finger will not be detected, and accordingly will not be tracked. In effect, the indexing into the past time history using the index table 430 flushes out secondary echo reflections and accordingly object motion from the history 400 buffer to permit accurate tracking of the primary target (finger).

Figure 5:
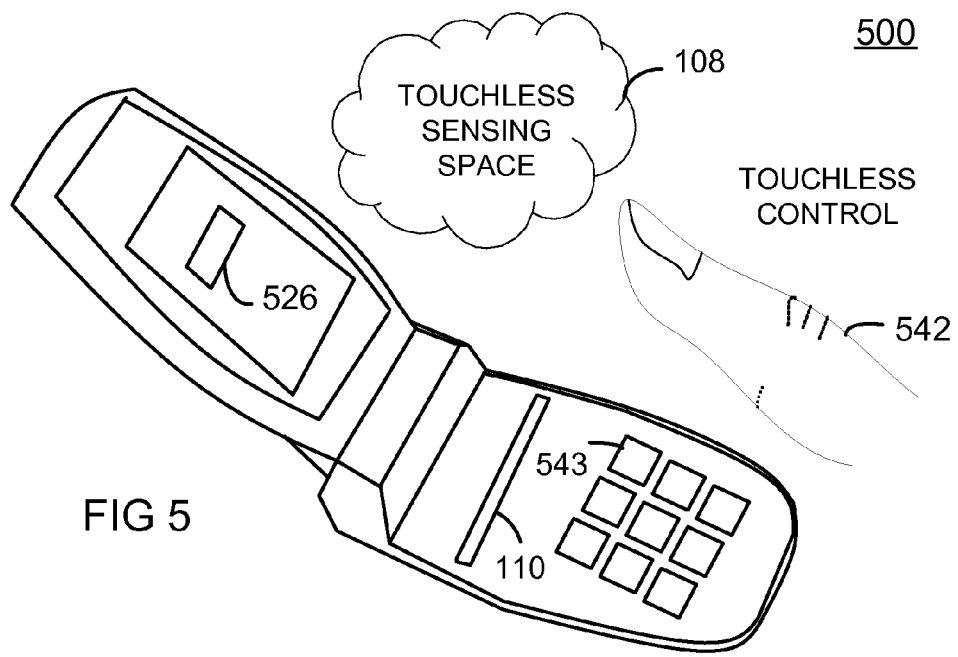
FIG. 5 is an exemplary configuration of the touchless sensing unit in a mobile device for providing touchless user interface control in accordance with an embodiment of the inventive arrangements.

Referring to FIG. 5, an exemplary application of the sensing unit 110 is shown. As illustrated the sensing device 110 can be integrated with a mobile device 500, although it can also be incorporated in a laptop or other portable media device. In one arrangement, the sensing unit 110 can be placed above a keypad 543 of the mobile device 500. The sensing unit 110 can create the touchless sensing space 108 over the keypad 543 and in front of a display. The touchless sensing space 108 is not limited to the arrangement shown. For example, the touchless sensing space 108 can be above the keypad, above the display, or above another portion of the mobile device 500. The touchless sensing space 108 provides a virtual interface to the mobile device. A user can position a finger 542 or a thumb within the touchless sensing space 108 to handle one of more controls of the mobile device, such as a menu item 526.

Figure 6:
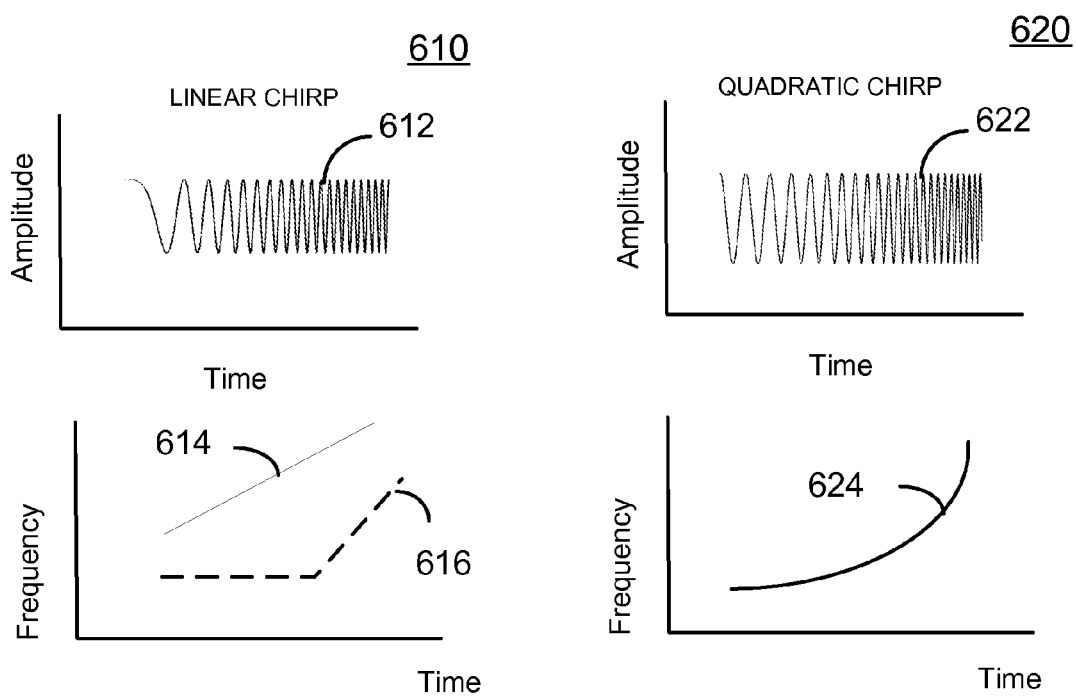
FIG. 6 is an illustration of chirp signals used for range detection in accordance with an embodiment of the inventive arrangements.

Referring to FIG. 6, a pair of chirp signals 610 and 620 is shown.

Briefly, the chirp signals are sent from the sensing unit 110 in a direction of an object, such as a finger (See FIG. 5). The chirp signals are reflected off the object and captured at the sensing unit 110. The chirp signals are condition pulse signals that improve a detectability of the pulse. The pulse shaper 101 in FIG. 1 can produce a linear chirp 610 or a quadratic chirp 620. The pulse shaper 101 can produce numerous types of chirp signals, of which 612 and 622 are provided for illustration. In one arrangement, the pulse shaper 101 can convert a square wave pulse to a chirp signal. Embodiments of the invention are not limited to these pulse shapes and other pulse shapes or combinations thereof are contemplated. It should be noted that the form of the chirp signals presented can be formed by means other than pulse compression. Analog and digital electronic circuits, op-amps, software programs, and digital logic can produce chirp signals similarly to those shown in FIG. 6, and the embodiments of the invention are not restricted to only employing a pulse shaper for producing the chirp.

In one example, the linear chirp 612 can be represented as a frequency modulated sine wave with linearly increasing frequency 614. As another example, the linear chirp 612 can also be represented as a piece-wise linear function shown in 616. For instance, the first portion of the chirp signal 616 can contain constant frequency modulation followed by a second portion which can be a linearly increasing frequency modulation. The chirp signal is not limited to being linearly modulated. For example, the pulse shaper 101 can produce a quadratic chirp signal 620. The quadratic chirp signal 620 can be characterized by a non-linearly varying frequency modulation with a quadratic phase. The chirp signal 622 can be represented by the frequency and time characteristics of plot 624. As can be seen, the frequency increases in an exponential fashion with time. The exponential frequency increase can be seen in the increased periodicity of the time signal 622.

Figure 7:
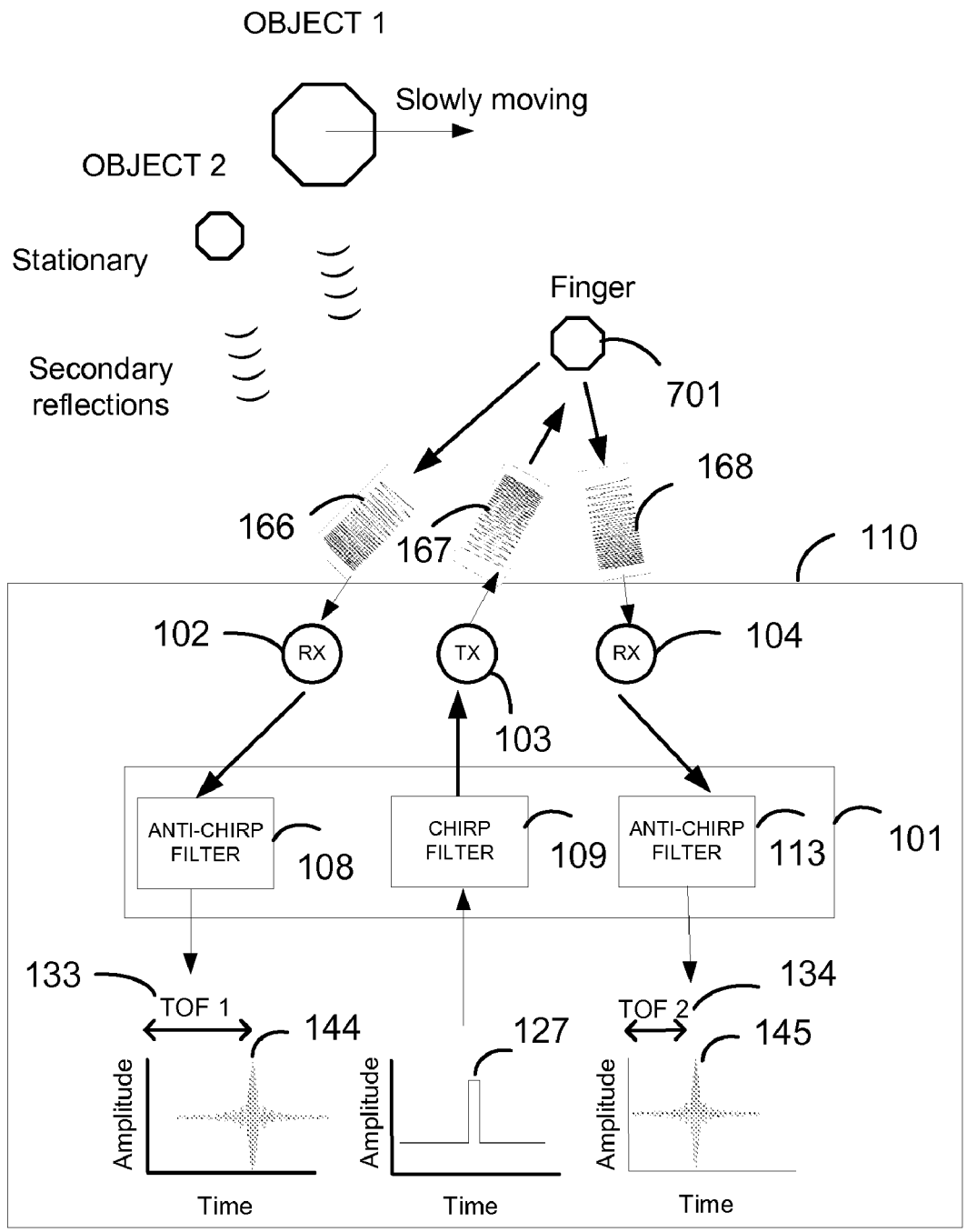
FIG. 7 is an illustration of pulse shaping for use in range detection in accordance with an embodiment of the inventive arrangements.

Referring to FIG. 7, an illustration 700 of pulse shaping in the context of a range detection application in accordance with the embodiments of the invention is shown. In particular, the sensing unit 110 can accurately track a location and movement of an object 701 moving in the presence of slowly moving objects (Object 1) or stationary objects (Object 2). The sensing unit 110 can include the pulse shaper 101 which can transmit and receive pulse shaped signals, such as chirp signals 310 and 320 (See FIG. 6). Briefly, the pulse shaper 101 uses chirp signals for increasing the timing resolution of a reflected signal, determining an accurate arrival time, and resolving the location and movement of the object 401 from the arrival time. As noted in FIG. 7, the chirp signals can improve a detection accuracy.

The sensing unit 110 can contain sensing elements 102, 103, and 104. In the shown arrangement, sensing units 102 and 104 serve as receivers, and the sensing element 104 serves as a transmitter. Multiple receivers, camera elements, and sensing instruments such as microphone arrays are contemplated within the scope of the invention. The operations among the sensing elements can be interchangeable and are shown only for illustration. The sensing unit 110 can emit and receive digital communication signals such as a binary signal or physical signals such as light, ultrasound, radio frequency, and acoustic waves.

As one example, the sensing unit 110 can rest atop a keyboard for detecting finger movement or within a keyboard 220 as previously shown in FIGS. 3 and 4. In such regard, the sensing unit 110 can be used to track a finger and control a user interface object in accordance with the finger movement. The sensing unit 110 can process multiple finger movements as well as hand movements, and is not restricted to tracking only solitary finger movements. The sensing unit 110 can acquire signal reflections off the finger for estimating a position of the finger or any other object.

The pulse shaper 101 can include at least one chirp filter 109 and at least one anti-chirp filter 108 as shown in FIG. 7. In one arrangement, the chirp filter 109 can process a square pulse 127, generated by the sensing unit 110, for producing a chirp signal 167 transmitted by the transmitting element 103.

The anti-chirp filter 108 can receive a reflected chirp signal 166 from the receive element 102 and convert the reflected chirp signal to a sinc (cardinal sine) modulated waveform 144, or any other suitable signal with strong coherence, or correlation, properties. The anti-chirp filter 113 can also receive a reflected chirp signal 168 from the receive element 104 and convert it to a sinc (cardinal sine) modulated waveform 145. The invention is not limited to converting the signal to a sinc functional as there are other signal formats suitable for increasing detectability. The pulse shaper 101 provides pulse compression to increase the resolution accuracy for tracking an object movement 401, such as a finger.

In one arrangement, the sensing unit 110 can directly transmit the square wave pulse 127 from the transmitter element 103 without using the pulse shaper 101. In another arrangement, the pulse shaper 101 is employed to shape the square wave pulse 127 into a more robust signal for detection purposes. In general, the sensing unit 110 without the pulse shaper 101 can transmit and receive square wave pulses for detecting a location of an object, such as a finger. For example, the TX element 103 can transmit a square pulse to a finger above a keyboard or a mobile device, and the signal can reflect off the finger producing a reflected signal which is captured by RX 102 and RX 104. Secondary echo reflections may be produced by Object 1 and Object 2 when in the vicinity of the finger 701.

Notably, the received echoes can be stored to the history 400 (see FIG. 4) for mitigating the effects of the slowly moving or stationary background Object 1 and Object 2 in the vicinity of the finger 701. Since the echoes inherently include contributory components of secondary echo reflections, the echo waveforms stored in the history provide a history of the secondary echo reflections. In such regard, the history table indirectly stores information associated with primary reflections from the finger and previous ambient components such as the secondary reflections.

In order to mitigate the secondary echo reflections, a previously stored echo in the history can be subtracted off when a current ambient components is distorting the echo. This includes indexing into the history and subtracting a previous echo saved in the history from an echo return that includes a primary response (PR) component, a direct path (DP) component, an ambient component (A), and a noise (N) component a Primary Response (PR) component. The sensing unit 110 can thus adaptively remove echo components received from a non-moving object in proximity of the finger to increase a signal to noise ratio of the echo for tracking the finger when the finger is moving by indexing into the history in accordance with the previous method steps and equations disclosed for calculating n*.

Upon subtracting off an previously stored echo component, or otherwise removing the contribution of secondary echo reflections, a time of flight (TOF) can be measured, and a position of the finger 401 can be determined using geometric positioning. Removing the secondary echo reflection increases the saliency of the primary echo reflection for detecting TOF and differential TOF measurements. The sensing unit employs geometric positioning which specifies one unique point for two TOF measurements. The principle can be extended to three dimensions similarly. The sensing device 110 can also identify a location and movement of an object in three dimensions with multiple sensors. For example, the flight path 103 to 401 to 104 specifies the TOF for the rightmost RX sensor, and the flight path 103 to 401 to 102 specifics the TOF for the leftmost RX sensor. The sensing unit 110 uses the two TOF measurements to determine a unique location of the finger in a two dimensional space 147. In the illustration, the sensing unit 110 estimates a finger location that corresponds to the point 401. With three receivers, the sensing unit 110 can identify a location and movement in three dimensions.

The embodiments of the invention serve to overcome the difficulty of determining the leading edge of the smeared square wave pulse through pulse compression and adaptive echo reduction previously discussed. Pulse compression produces a transmitted signal that is more robust to amplitude and phase variations produced by the environment or transducer elements within the sensing unit. Pulse compression is applied to decrease the estimated projection error space 844 within the vicinity of the object for which a location is desired. Further, pulse compression is applied within a multi-dimensional processing space for identifying absolute positions as well as relative displacements. For example, the sensing device 110 can be used for sensing finger movement for controlling a cursor on a display in a laptop application. The cursor can be moved in accordance with the determined absolute position and relative displacement of the finger. Pulse shaping increases the resolution accuracy for TOF measurements, and accordingly, the accuracy in moving the cursor.

In another arrangement, for increasing resolution accuracy, echoes can be selectively discarded with respect to time information. For example, if the object of interest is known a priori or through direct measurement to be a distance D away from the sensing array so that the round trip travel time of the ultrasonic pulse is Tob=2*D/c, where c is the speed of sound, then all echo measurements prior to time Tob need not be measured or stored. If the echo is recorded starting at time Tstart and continues for a time Tmeas, where Tstart is <=Tob, and Tmeas is sufficiently long enough to capture all necessary echo information on the object to be tracked, then the data acquisition, storage space, and processing time can be reduced. Further, Tstart can be updated based on TOF measurements to ensure an optimal balance between minimizing the system resources dedicated to acquiring and processing the data and maximizing the information necessary for tracking the object.

From the foregoing descriptions, it would be evident to an artisan with ordinary skill in the art that the aforementioned embodiments can be modified, reduced, or enhanced without departing from the scope and spirit of the claims described below. For example, the sensing device 100 can be deployed in industrial settings for monitoring motion of objects on a production line, in an ATM banking machine for touchless pin code entry, in a gas station for touchless credit card entry, or an airport kiosk machine for touchless flight reservations. From the embodiments of FIGS. 1-7 it should be evident to one of ordinary skill in the art that there are innumerable ways to use the sensor device. Accordingly, the reader is directed to the claims for a fuller understanding of the breadth and scope of the present disclosure.

Figure 8:
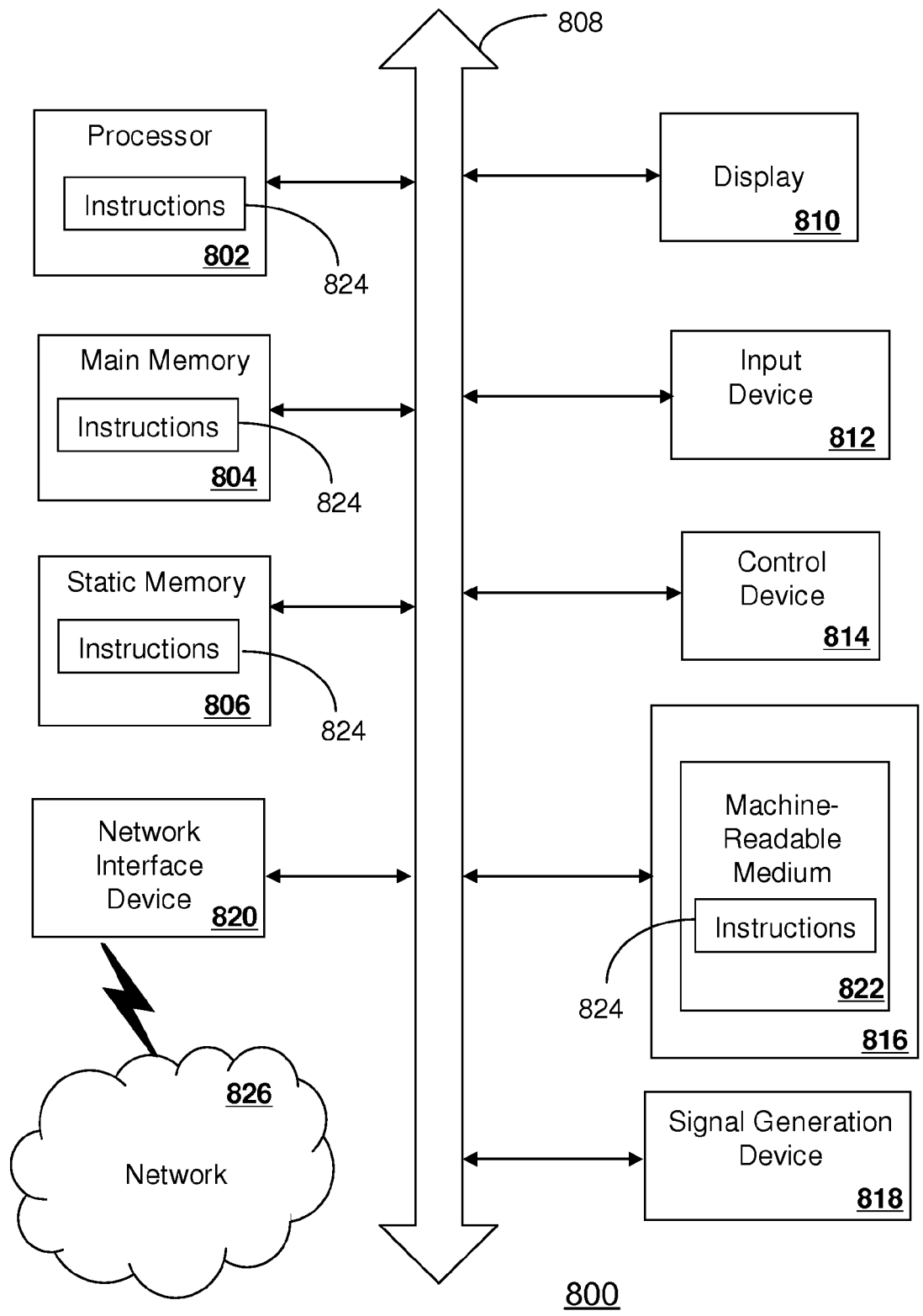
FIG. 8 depicts an exemplary diagrammatic representation of a machine in the form of a computer system within which a set of instructions, when executed, may cause the machine to perform any one or more of the methodologies disclosed herein

FIG. 8 depicts an exemplary diagrammatic representation of a machine for supporting operation of the sensor device in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a mass storage medium 816, a signal generation device 818 (e.g., a speaker or remote control) and a network interface device 820.

The mass storage medium 816 may include a computer-readable storage medium 822 on which is stored one or more sets of instructions (e.g., software 824) embodying any one or more of the methodologies or functions described herein, including those methods illustrated above. The computer-readable storage medium 822 can be an electromechanical medium such as a common disk drive, or a mass storage medium with no moving parts such as Flash or like non-volatile memories. The instructions 824 may also reside, completely or at least partially, within the main memory 804, the static memory 806, and/or within the processor 802 during execution thereof by the computer system 800. The main memory 804 and the processor 802 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable storage medium 822 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, USB) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for short range detection using ultrasonic sensing, comprising:
   shaping a pulse signal to produce a pulse shaped signal;
   transmitting the pulse shaped signal, the pulse shaped signal reflecting off a finger to produce a reflected signal;
   receiving the reflected signal;
   identifying a relative phase of the reflected signal with respect to a previously received reflected signal;
   tracking a location and a movement of the finger from an arrival time of the reflected signal and the relative phase;
   saving most recent echoes to a history, and selectively discarding echoes less recently saved in the history based on a similarity measure between echoes in the history; and
   providing touchless control to a user interface control in accordance with the location and the movement of the finger,
   wherein the shaping uses a combination of amplitude modulation, frequency modulation, and phase modulation.

2. The method of claim 1, further comprising converting the location and the movement to a coordinate or control action to associate with the user interface control.

3. The method for claim 1, wherein the step of identifying further comprises:
   identifying an arrival time from a correlation between a first reflected signal and a second reflected signal;
   identifying a phase delay from the correlation for establishing a relative displacement of the finger; and
   controlling the user interface control in accordance with the arrival time and the relative displacement.

4. The method of claim 1, wherein the step of discarding echoes comprises selectively pruning the history based on one among an L2 norm based, spectral distortion based, log-likelihood based, or mean-squared error based metric.

5. The method of claim 1, comprising
   creating a sparse history of echoes based on a difference rate between echoes; and
   updating an index table to the echoes in the history according to the sparse history,
   wherein the sparse history weights echoes more heavily in the near-time than in the far-time.

6. The method of claim 5, comprising
   scanning through the history to identify an index for the echoes where an echo difference $(ePR(i)-ePR(i-n))$ is significantly greater than a noise difference $(n(i)-n(i-n))$,
   where the index is large and that the echo difference for current and past ambient conditions are below a predetermined minimum threshold.

7. A method for enhancing range detection accuracy suitable for use in ultrasonic touchless sensing applications, comprising
   transmitting an ultrasonic signal intended to reflect off a finger and produce an echo;
   receiving the echo and saving most recent echoes to a history;
   selectively discarding echoes less recently saved in the history to produce a sparse history;
   identifying a relative phase of the echo with respect to a previously received echo in the sparse history;
   comparing the echoes in the history for similarity and selectively pruning echoes in the history with high similarity;
   replacing the pruned echoes with echoes having low similarity;
   tracking a location and a movement of the finger from an arrival time of the echo and the relative phase; and
   providing touchless control to a user interface control in accordance with the location and the movement of the finger.

8. The method of claim 7, comprising
   generating an index table for the echoes in the history such that the history then identifies echoes with time indexes and corresponding distance measures.

9. The method of claim 7, comprising
   comparing a present echo to the echoes in the history to calculate an updated set of differences; and
   removing echoes in the history that do not contribute a noticeable difference based on the updated set of differences for pruning the echoes in the history.

10. The method of claim 9, comprising subtracting off an echo if a current ambient components is distorting the echo.

11. The method of claim 7, where the history table indirectly stores information associated with previous ambient components.

12. The method of claim 7, comprising subtracting from an echo return that includes a primary response (PR) component, a direct path (DP) component, an ambient component (A), and a noise (N) component a Primary Response (PR) component of a previous echo saved in the history.

13. The method of claim 12, comprising adaptively removing echo components received from a non-moving object in proximity of the finger to increase a signal to noise ratio of the echo for tracking the finger when the finger is moving.

* * * * *